(No Model.)
H. A. CHASE.
ELECTRIC MOTOR.
No. 389,197. Patented Sept. 11, 1888.
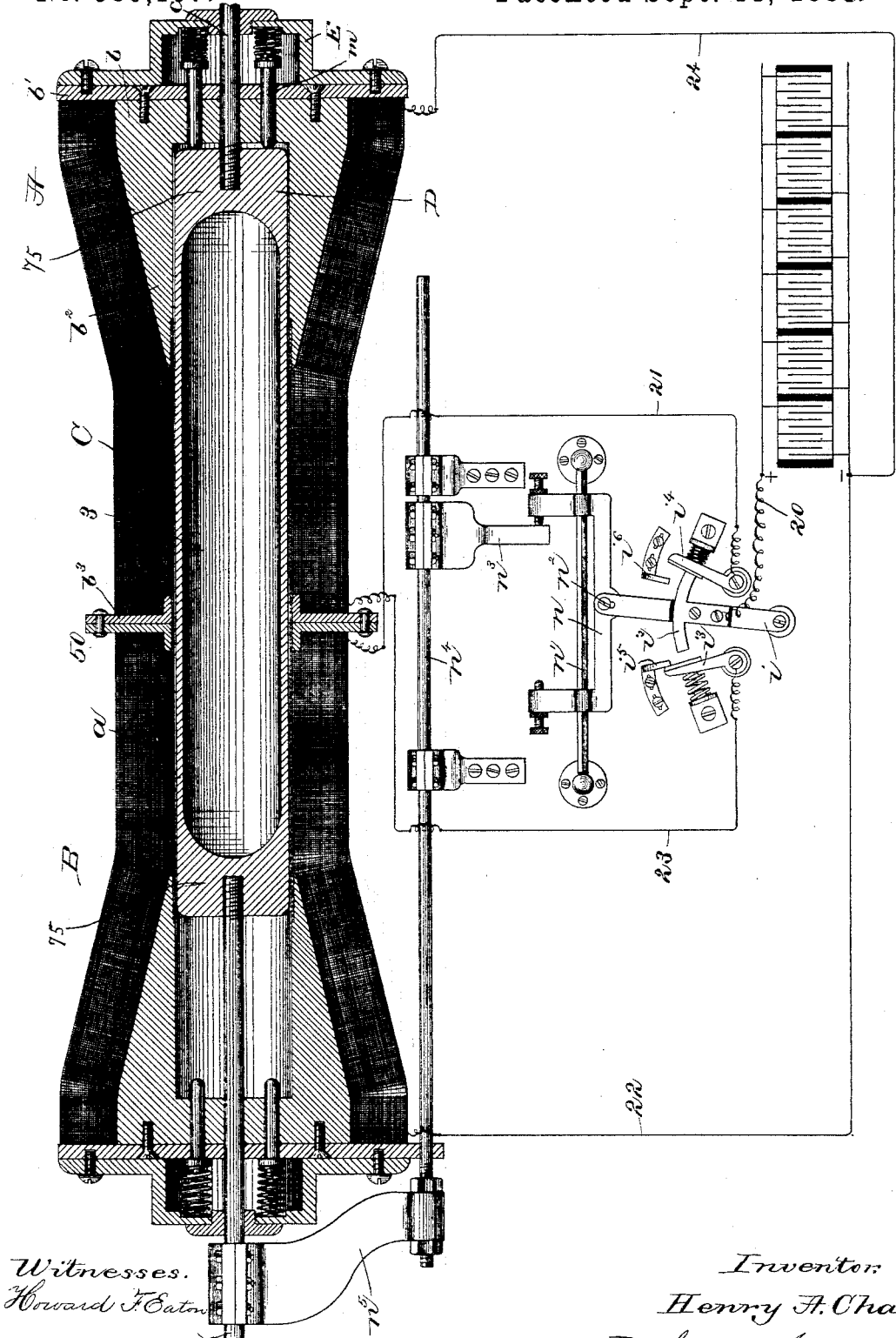
Witnesses.
Howard F. Eaton
Frederick L. Emery
Inventor:
Henry A. Chase.
By Crosby & Gregory
Attys.

UNITED STATES PATENT OFFICE.

HENRY A. CHASE, OF STONEHAM, MASSACHUSETTS.

ELECTRIC MOTOR.

SPECIFICATION forming part of Letters Patent No. 389,197, dated September 11, 1888.

Application filed April 16, 1888. Serial No. 270,843. (No model.)

*To all whom it may concern:*

Be it known that I, HENRY A. CHASE, of Stoneham, county of Middlesex, State of Massachusetts, have invented an Improvement in Electric Motors, of which the following description, in connection with the accompanying drawing, is a specification, like letters on the drawing representing like parts.

This invention has for its object to construct an electric motor; and it consists in the combination, with two electro magnetic devices or solenoids, of a hollow reciprocating bar having closed ends and serving as or forming the armature of the said electro-magnets or solenoids, and a switch or electric cut-out adapted to be moved to cut out the said electro-magnets alternately, thereby permitting the current to traverse the coils of first one and then the other electro-magnet, moving the bar or piston armature first in one and then in the opposite direction; also, in the combination, with two electro-magnetic devices or solenoids the tubular shanks of which have the larger quantity or mass of magnetic material at one end, of a reciprocating bar moving in said tubular shanks, substantially as will be described.

The invention also consists in details of construction, to be hereinafter described.

The drawing shows in horizontal section an electric motor embodying this invention, the switch being shown in plan view.

The electro-magnets or solenoids A B are each constructed substantially alike, so that one only will be described.

A brass tube, $a$, has attached to it at one end a cap, $b$, having a plate or disk, $b'$, and a tubular or hollow tapering shank, $b^2$, said shank embracing a portion only of the tube $a$. The cap $b$ is made of magnetic material. A disk, $b^3$, is attached to the tube $a$ at the end opposite the cap. A spool is thus formed, the shank of which is composed of the tube $a$ and shank $b^2$, while the ends or heads are composed of the plate or disk $b'$ and disk $b^3$. The hollow shank is closed at one end by the said cap $b$. The coil of wire C is wound upon the spool thus formed. The armature D, also made of magnetic material, is placed within the tube $a$, it being made cylindrical and attached to a rod, $c$, passing through the cap $b$ or closed end of the spool. A bracket or frame, E, is attached to the cap $b$, and the rod $c$ has its bearings in said bracket.

The electro magnet or solenoid thus far described is substantially the same as that shown and described in application for Letters Patent, Serial No. 269,504, filed April 3, 1888, to which reference may be had.

As herein shown, the two electro magnets A B, constructed as above described, are placed in line with each other, the rear ends or disks, $b^3$, abutting against each other and being attached by bolts 50, so that a long chamber is formed within, closed at each end by the caps $b$. The armatures D of the said magnets, instead of being two independent armatures, are made as a one piece or single bar, hollowed out or chambered, as at 3, to practically form a tube with closed ends 75, the rods $c$ being attached to the said ends, as before stated; or, in other words, to form the end pieces, 75, joined or connected by a tube. The armature-bar is somewhat shorter than the long chamber in which it is placed, so that it can move or be moved first toward the cap $b$ of one and then toward the cap $b$ of the other solenoid; but such movement or stroke is less than the length of either shank $b^2$ of the cap, and as the caps are made of magnetic material, the armature moving away from either cap never leaves the magnetic field of force.

The coils C, wound upon the spools, are independent of each other, and when the current traverses one coil and is cut off from the other coil, the armature is instantly moved toward the cap of the spool through the coils of which the current is traversing, and vice versa.

The brass tube $a$ prevents the armature sticking to the sides of the chamber, and as said armature is made hollow, except at the ends, and said ends lie in the magnetic field of force, said ends are drawn toward the most central or intense part thereof, which is at or near the closed end of the chamber. It is designed to reciprocate the armature-bar, and hence the current is made to traverse the coil of one solenoid and then the other, and I have herein shown means for automatically effecting this result. A switch composed of a lever or bar, $i$, pivoted at $i'$, is employed, it having a cross-bar, $i^2$, secured to it. One arm of the cross-bar $i^2$ is adapted to co-operate with or engage a contact block or lever, $i^3$, and the other arm of the cross-bar $i^2$ is adapted to co-operate with or engage another contact block or lever, $i^4$, said contact blocks or levers being normally pressed against contact-stops $i^5$ $i^6$, respectively, by springs. With the switch-arm $i$ in the position shown, the battery-current passes over wire 20, cross bar $i^2$, block or lever $i^4$, wire 21 to the coil of one of the electro-magnets or solenoids B, returning by wire 22 to battery. When the switch arm or lever $i$ is in its other position, the current from battery passes over wire 20, cross-bar $i^2$, contact block or lever $i^3$, wire 23 to the coil of the other magnet or solenoid, as A, returning by wire 24 to battery. The switch is moved by a yoke, $n$, sliding on a bar or rod, $n'$, said lever being connected with the yoke by a pin, $n^2$. An arm, $n^3$, secured to a rod, $n^4$, sliding in suitable bearings, strikes in its movement first one and then the other arm of the yoke, moving it a short distance. The rod $n^4$ is connected with the rod $c$ by a bent arm, $n^5$, or other suitable connection.

It will be seen that as the current traverses the coils of the magnets alternately the armature-bar will be reciprocated, and the switch arm or lever thereby moved.

I have placed two yielding or spring-controlled pins, $m$, in each cap $b$, to resist and limit the movement of the armature-bar.

I have made the armature-bar hollow, so that the magnetic force may focus or accumulate at the ends 75, and instead of joining the ends 75 by a tube it might be joined by a small rod much less in diameter than the ends 75.

I claim—

1. In an electric motor, two electro-magnets or solenoids placed end to end to form a long cylindrical chamber within, combined with the common hollow or tubular armature having closed ends, substantially as described.

2. In an electric motor, two electro-magnets or solenoids, each composed of a spool having a tubular tapering shank and a closed end piece of magnetic material, combined with the armature movable toward and from said closed ends in the magnetic field of the said tubular tapering shank, substantially as described.

3. In an electric motor, two electro-magnets or solenoids, each composed of a spool having a tubular shank and an end piece having the plate or disk $b'$ and recessed shank, combined with the connected end pieces, $b^3$, substantially as described.

4. In an electric motor, two electro-magnets or solenoids, each composed of a spool having a tubular shank, part only of which is made of magnetic material, combined with the connected end pieces, 75, movable in the tubular shanks in the field of force of the magnetic material, substantially as described.

5. In an electric motor, two electro-magnets or solenoids, each having one end of its tubular shank closed with magnetic material, combined with the connected end pieces, 75, and with the yielding limiting-stops, substantially as described.

6. In an electric motor, two electro-magnets or solenoids and the movable armature, combined with the arm $n^3$, moved directly or indirectly by the armature, the yoke $n$, and the switch arm or lever $i$, substantially as described.

In testimony whereof I have signed my name to this specification in the presence of two subscribing witnesses.

HENRY A. CHASE.

Witnesses:
BERNICE J. NOYES,
HOWARD F. EATON.